United States Patent
Kume

(10) Patent No.: US 11,913,525 B2
(45) Date of Patent: Feb. 27, 2024

(54) BELT DRIVE DEVICE

(71) Applicant: FANUC CORPORATION, Yamanashi (JP)

(72) Inventor: Hirokazu Kume, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/996,205

(22) PCT Filed: Jul. 26, 2021

(86) PCT No.: PCT/JP2021/027496
§ 371 (c)(1),
(2) Date: Oct. 13, 2022

(87) PCT Pub. No.: WO2022/024977
PCT Pub. Date: Feb. 3, 2022

(65) Prior Publication Data
US 2023/0213088 A1    Jul. 6, 2023

(30) Foreign Application Priority Data
Jul. 31, 2020  (JP) .................. 2020-130298

(51) Int. Cl.
*F16H 19/08*  (2006.01)
*B25J 9/10*  (2006.01)
*F16H 7/10*  (2006.01)

(52) U.S. Cl.
CPC ............ *F16H 19/08* (2013.01); *B25J 9/1045* (2013.01); *F16H 7/10* (2013.01); *F16H 2019/085* (2013.01)

(58) Field of Classification Search
CPC ...... F16H 19/08; F16H 2019/085; F16H 7/10; B25J 9/1045
See application file for complete search history.

(56) References Cited

U.S. PATENT DOCUMENTS

2019/0275685 A1 * 9/2019 Murakami ............ B25J 19/007

FOREIGN PATENT DOCUMENTS

| JP | 2005-343394 A | 12/2005 |
| JP | 2013-159161 A | 8/2013 |
| JP | 2016-074067 A | 5/2016 |

OTHER PUBLICATIONS

International Search Report issued in PCT/JP2021/027496; dated Sep. 7, 2021.

* cited by examiner

*Primary Examiner* — Charles A Fox
*Assistant Examiner* — Gregory T Prather
(74) *Attorney, Agent, or Firm* — Studebaker & Brackett PC

(57) ABSTRACT

In the present invention, dislodging of a belt is prevented even when there is slack in a fastening member that secures a movement-side pulley for adjusting an inter-axial distance. An adjustment mechanism that adjusts an inter-axial distance between a first pulley and a second pulley is provided with a support member to which the first pulley is provided, first and second long holes provided in an arm part body, first bolts that are inserted into the first long holes and that fasten the support member to the arm part body, and second bolts that are inserted into the second long holes and that fasten the support member to the arm part body. The first long holes have a first length that enables the support member to move toward the second pulley until the inter-axial distance reaches a distance at which the belt can be wound between the first and second pulleys. The second long holes have a second length that retains the inter-axial distance at a distance such that the state in which the belt is wound between the first and second pulleys is not dislodged.

6 Claims, 11 Drawing Sheets

BELT DRIVE DEVICE

TECHNICAL FIELD

The present invention relates to a belt drive device.

BACKGROUND ART

In the known art, an articulated robot including a plurality of arms rotatably connected via joints (axes) is used as a robot for performing tasks such as transferring and mounting semiconductor parts, for example. In this type of robot, rotation of a drive-side pulley is transmitted to a driven-side pulley by a belt, and a rotatable member such as an arm is rotated by the rotation of the driven-side pulley (see, for example, Patent Document 1). Patent Document 1 discloses a mechanism in which an interaxial distance between a pair of pulleys can be adjusted by screwing one of the pulleys by means of a long hole, and a tension of the belt can be adjusted.

Patent Document 1: Japanese Unexamined Patent Application, Publication No. 2016-074067

DISCLOSURE OF THE INVENTION

Problems to be Solved by the Invention

According to such a mechanism in which an interaxial distance between a pair of pulleys is adjustable with use of a long hole, a tension can be applied to a belt by reducing the interaxial distance, winding the belt around both the pulleys, and then increasing the interaxial distance. However, if there is slack in a fastening screw penetrating through the long hole, the pulley may move to reduce the interaxial distance and the belt may be dislodged from the pulley. Therefore, a technique is desired that can prevent dislodging of a belt even when there is slack in a screw that secures a movement-side pulley for adjusting the interaxial distance.

Means for Solving the Problems

A belt drive device according to one aspect of the present disclosure is a belt drive device including a first pulley and a second pulley that are rotatably arranged at a predetermined distance in a device main body, a belt that is configured to be wrapped around the first pulley and the second pulley, and an adjustment mechanism that is provided to the first pulley and configured to adjust an interaxial distance between the first pulley and the second pulley, wherein the adjustment mechanism includes a support member that rotatably supports the first pulley, a first long hole provided in at least one selected from the device main body and the support member, the first long hole having a length direction along an interaxial direction that connects a rotation axis of the first pulley and a rotation axis of the second pulley, a first fastening member including a shaft portion that is inserted into the first long hole and that fastens the support member to the device main body, a second long hole provided in at least one selected from the device main body and the support member, the second long hole having a length direction along the interaxial direction, the second long hole being shorter than the first long hole, and a second fastening member including a shaft portion that is inserted into the second long hole and that fastens the support member to the device main body, the first long hole has a first length that allows the support member to move toward the second pulley until the interaxial distance reaches at least a distance at which the belt can be wrapped around the first pulley and the second pulley, and the second long hole has a second length that retains the interaxial distance to a distance at which the belt wrapped around the first pulley and the second pulley is prevented from being dislodged.

Effects of the Invention

According to one aspect, dislodging of a belt can be prevented even when there is slack in a fastening member that secures a movement-side pulley for adjusting an interaxial distance.

PREFERRED MODE FOR CARRYING OUT THE INVENTION

Hereinafter, embodiments of the present disclosure will be described with reference to the drawings. The word "substantial/substantially" as used herein is not intended to strictly specify a state, size, direction, orientation, or the like, but to mean inclusion of ranges in which functions and effects of the state, size, direction, orientation, or the like are achievable.

Figure 1:
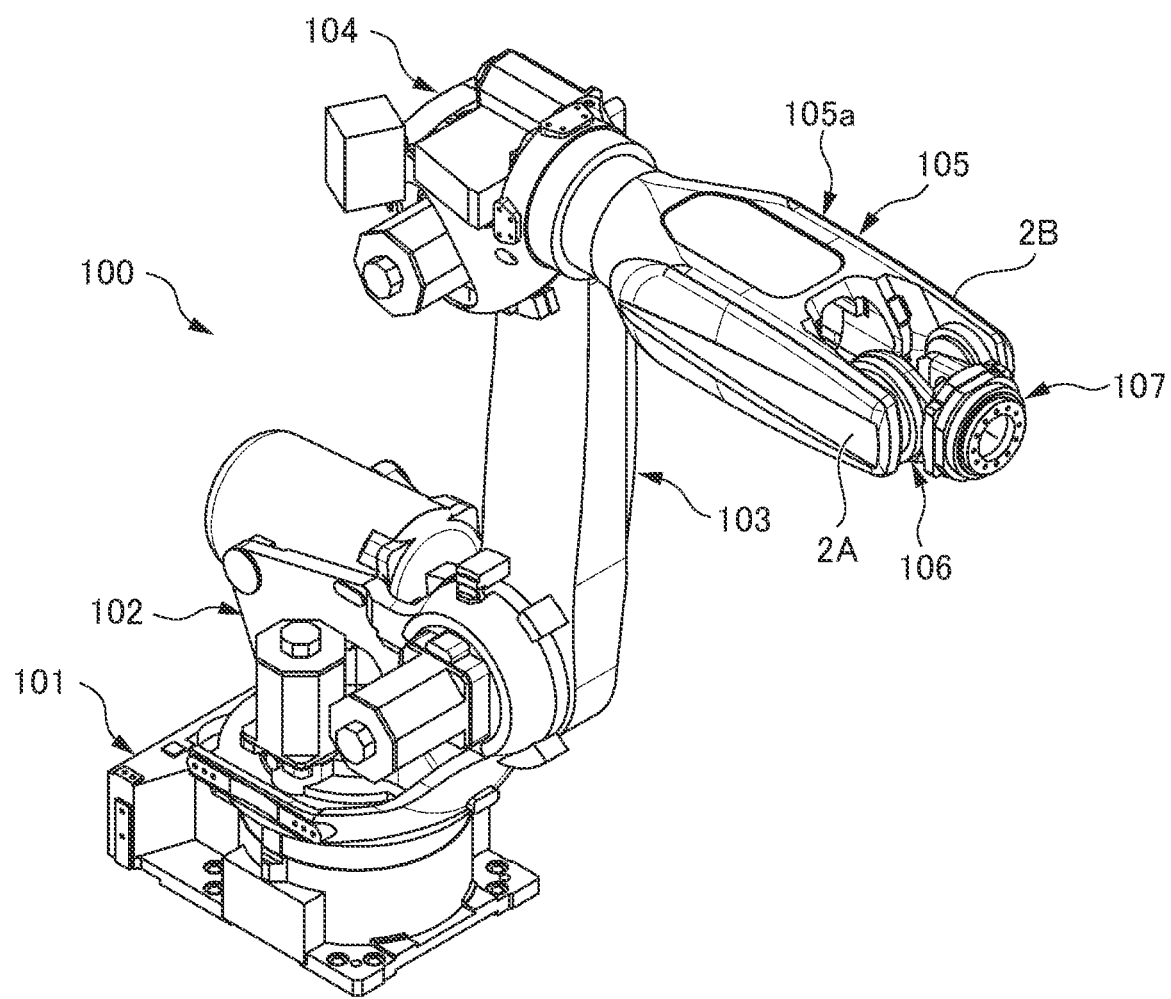
FIG. 1 is a perspective view of an industrial robot including a wrist pivot part provided with a belt drive device according to an embodiment of the present disclosure.
Figure 2:
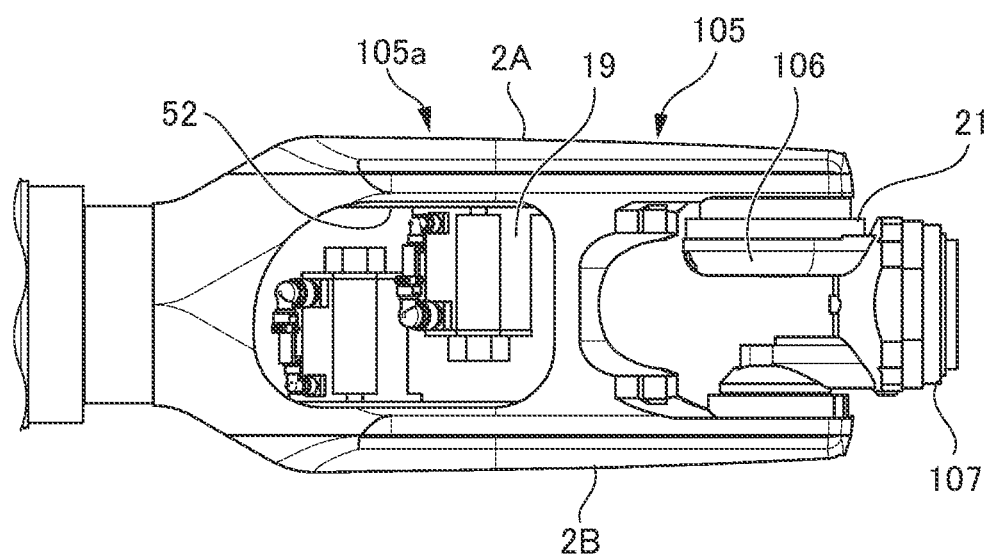
FIG. 2 is a diagram showing a lower surface of the wrist pivot part.

FIG. 1 is a perspective view showing an appearance of an industrial articulated robot 100 according to an embodiment of the present disclosure. FIG. 2 is a view of a wrist pivot part 105 shown in FIG. 1 and seen from below. An articulated robot 100 is an articulated robot including a structure with a 6-axis degree of freedom, including a base 101, a pivot part 102, a lower arm part 103, an upper arm part 104, the wrist pivot part 105, a wrist bending part 106, and a wrist rotation part 107.

Figure 3:
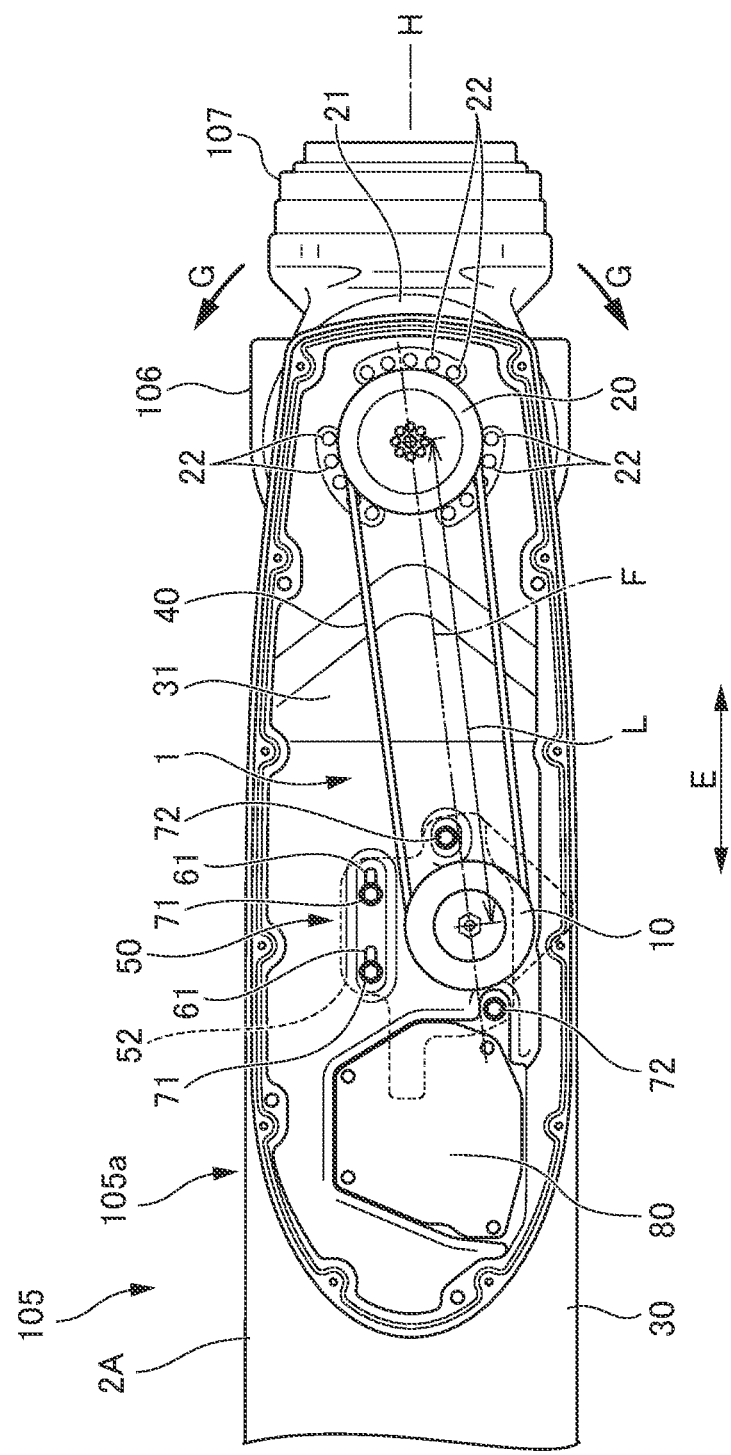
FIG. 3 is a side view showing a first arm part of the wrist pivot part provided with the belt drive device according to the embodiment of the present disclosure.

As shown in FIG. 2, the wrist pivot part 105 includes an arm casing 105a. The arm casing 105a includes a first arm part 2A and a second arm part 2B arranged in parallel with each other. The first arm part 2A and the second arm part 2B constitute side plate parts on both sides of the arm casing 105a, respectively. FIG. 3 shows a state where a length direction E of the arm casing 105a is substantially horizontal. As shown in FIG. 3, the first arm part 2A includes a belt drive device 1 according to the embodiment of the present disclosure.

The first arm part 2A includes an arm part body 30 that is long in a front-rear direction (in FIG. 3, the right side corresponds to the front side and the left side corresponds to the rear side). The arm part body 30 is an example of a device main body. The wrist bending part 106 is provided in a front end portion of the arm part body 30. The wrist bending part 106 rotates in an arrow G direction by rotating a second pulley 20 to be described later. The wrist bending part 106 is an example of a rotating member. Furthermore, at a distal end of the wrist bending part 106, the wrist rotation part 107 that rotates around a rotation axis H as a rotation center is supported. At a distal end of the wrist rotation part 107, for example, a hand (not shown) or the like with which a part such as a semiconductor part is grasped is mounted.

The belt drive device 1 according to the present embodiment includes a first pulley 10 and the second pulley 20 that are attached to the arm part body 30, a belt 40 wrapped around the first pulley 10 and the second pulley 20, and an adjustment mechanism 50.

Figure 4:
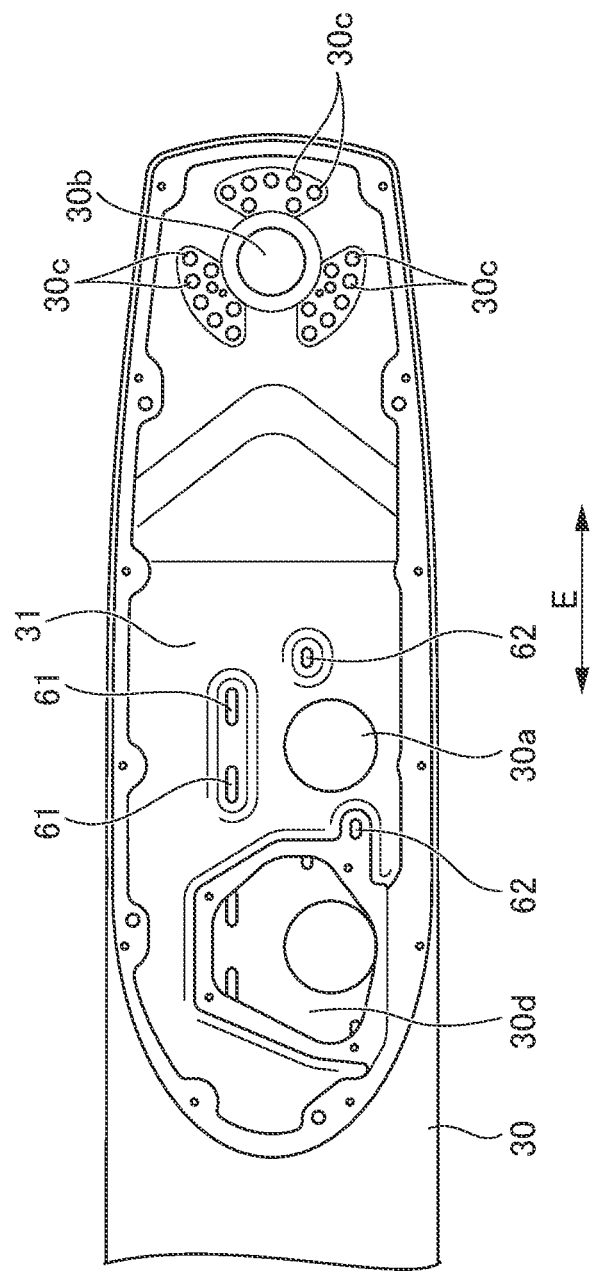
FIG. 4 is a side view of an arm part body according to the embodiment of the present disclosure.

A housing portion 31 is provided on one side surface of the arm part body 30. The housing portion 31 is covered with a cover (not shown). The first pulley 10, the second pulley 20 and the belt 40 are housed in the housing portion 31 covered with the cover. FIG. 4 shows the arm part body 30 having the first pulley 10, the second pulley 20 and the belt 40 removed from the housing portion 31.

The first pulley 10 is configured as a drive pulley. The second pulley 20 is configured as a driven pulley. The belt 40 is wrapped around the first pulley 10 and the second pulley 20 and transmits the rotation of the first pulley 10 to the second pulley 20. In the present embodiment, the first pulley 10 and the second pulley 20 are toothed timing pulleys. The belt 40 is a toothed timing belt that engages with teeth of the first pulley 10 and those of the second pulley 20. In the drawings other than FIG. 13, teeth are not shown.

Figure 5:
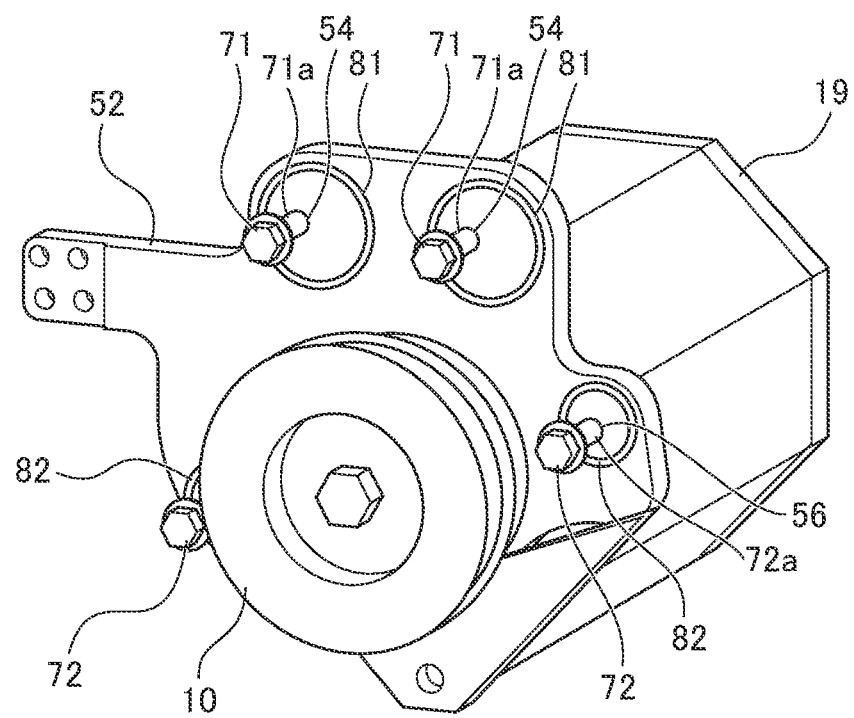
FIG. 5 is a perspective view showing a support member that supports a first pulley according to the embodiment of the present disclosure.
Figure 6:
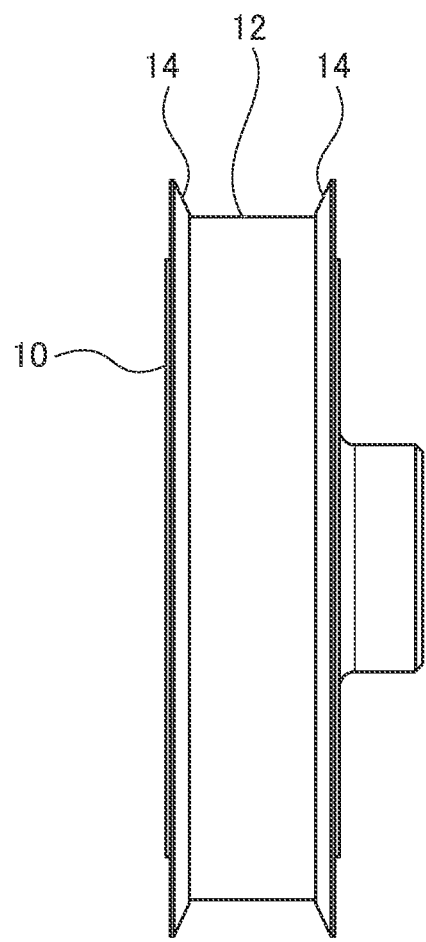
FIG. 6 is a front view of the first pulley according to the embodiment of the present disclosure.

The first pulley 10 is disposed in a central portion of the arm part body 30 in a length direction. The length direction of the arm part body 30 is the same as the length direction E of the first arm part 2A and is hereinafter referred to also as the length direction E of the arm part body 30 as appropriate. As shown in FIG. 5, the first pulley 10 is rotatably supported on a support member 52 of the adjustment mechanism 50 to be described later. The support member 52 is fixed to a back surface of the arm part body 30 in FIG. 3. A rotation axis of the first pulley 10 rotatably supported on the support member 52 extends through a hole 30a of the arm part body 30. As shown in FIG. 6, the first pulley 10 includes, on its axially opposite sides, flange portions 14 provided adjacent to a circumferential surface 12 and configured to prevent dislodging of the belt 40. The first pulley 10 is rotationally driven by a drive unit 19 including a motor shown in FIG. 5.

The second pulley 20 is disposed in a front end portion of the arm part body 30. A winding diameter for the belt 40 of the second pulley 20 is slightly larger than that of the first pulley 10. The second pulley 20 is rotatably supported on a disc-shaped support plate 21. The support plate 21 incorporates a reducer that decelerates the rotation of the second pulley 20 and transmits the rotation to the wrist bending part 106. The support plate 21 is fixed to the back surface of the arm part body 30 in FIG. 3 with a plurality of fixing bolts 22. A rotation axis of the second pulley 20 extends through a hole 30b of the arm part body 30. The arm part body 30 has therein insertion holes 30c through which the plurality of fixing bolts 22 are inserted. Similarly to the first pulley 10, the second pulley 20 also includes, on its axially opposite sides, flange portions provided adjacent to a circumferential surface and configured to prevent dislodging of the belt 40. The rotation of the second pulley 20 is braked via the belt 40 by the first pulley 10 driven by the drive unit 19.

As shown in FIG. 3, in a state where the first arm part 2A is substantially horizontal, the first pulley 10 is disposed below the second pulley 20. An interaxial direction represented by a straight line F (hereinafter, referred to also as an interaxial direction F as appropriate) that connects the rotation axis of the first pulley 10 and the rotation axis of the second pulley 20 is slightly inclined upward and forward relative to the length direction E of the first arm part 2A.

Figure 7:
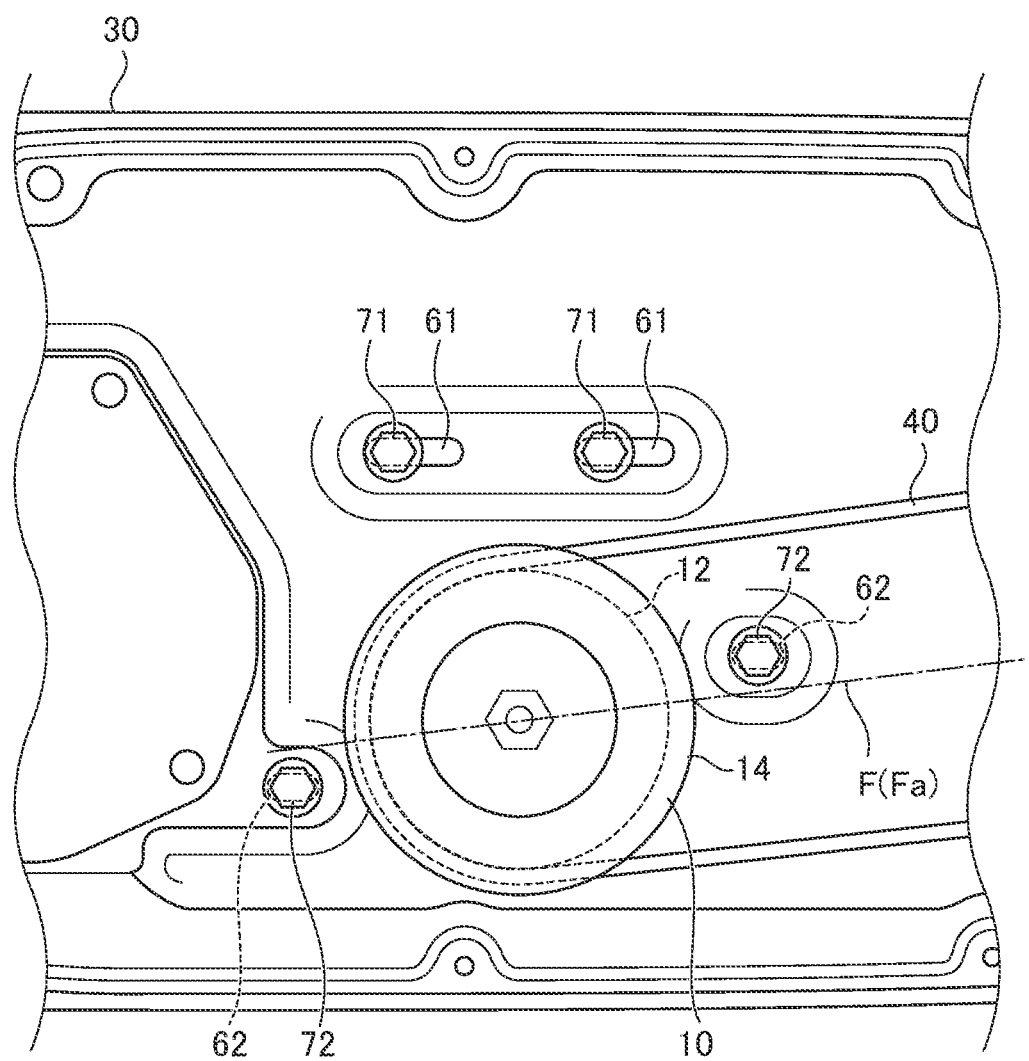
FIG. 7 is an enlarged view of an adjustment mechanism shown in FIG. 3.

As shown in FIGS. 5 and 7, the adjustment mechanism 50 includes the support member 52 that rotatably supports the first pulley 10, a plurality of first long holes 61 and second long holes 62 provided in the arm part body 30, a first bolt 71 inserted into each first long hole 61, and a second bolt 72 inserted into each second long hole 62. The first bolt 71 is an example of a first fastening member, and the second bolt 72 is an example of a second fastening member. The first bolt 71 and the second bolt 72 have the same size.

The support member 52 is a plate material formed into a predetermined shape. In FIG. 7, the support member 52 is fixed to the back surface of the arm part body 30. The support member 52 is fixed to the arm part body 30 with the first bolts 71 and the second bolts 72.

In FIG. 4, two first long holes 61 are arranged in the front-rear direction above the hole 30a. The two first long holes 61 have a collinear length direction extending substantially parallel to the length direction E of the arm part body 30. Therefore, when the length direction E of the arm part body 30 is substantially horizontal, the two first long holes 61 have the length direction extending in a substantially horizontal direction. The first bolt 71 is inserted into each of the two first long holes 61. When the arm part body 30 is rotated so as to be substantially horizontal so that the length direction of the two first long holes 61 extends in the substantially horizontal direction, a situation is unlikely to occur where the support member 52 and the first pulley 10 are biased toward either of front or rear direction due to gravity. For this reason, it is easy to adjust a tension of the belt 40 to be described later.

As shown in FIG. 5, two first screw holes 54, into which the first bolts 71 are screwed, are formed in the support member 52. An annular first sealing member 81 surrounding the first long hole 61 is disposed around each of the two first screw holes 54. Each first bolt 71 has a shaft portion 71a having a thread formed thereon, and the shaft portion 71a is inserted from a housing portion 31 side of the arm part body 30 into the associated first long hole 61 and screwed into the associated first screw hole 54 of the support member 52.

As shown in FIG. 4, two second long holes in total are formed on sides of the hole 30a: one on a front side and the other on a rear side of the hole 30a (the right and left sides in FIG. 4). In a state where the arm part body 30 is substantially horizontal, the front second long hole 62 is located above a center of the hole 30a, and the rear second long hole 62 is located below the center of the hole 30a. The two second long holes 62 have a length direction substantially parallel to the first long hole 61. The second bolt 72 is inserted into each of the two second long holes 62.

As shown in FIG. 7, the front and rear second long holes 62 are located in the vicinity of the straight line F indicating the interaxial direction connecting the rotation axis of the first pulley 10 and the rotation axis of the second pulley 20. In the side view, two second long holes 62 are arranged on both sides of the straight line F, respectively. Specifically, the two front and rear second long holes 62 include the front second long hole 62 that is located in an upper zone and the rear second long hole 62 that is located in a lower zone of the virtual plane Fa, the upper and lower zones being partitioned by a virtual plane Fa passing through the straight line F. The second long hole 62 can be completely covered with a bearing surface of a head of the second bolt 72. With such an arrangement, the first pulley 10 can be stably fixed with the second bolts 72 respectively inserted into the front and rear second long holes 62.

As shown in FIG. 5, two second screw holes 56, into each of which the second bolt 72 is screwed, are formed in the support member 52. In FIG. 5, one (rear) second screw hole 56 is invisible because it is hidden behind the first pulley 10. An annular second sealing member 82 surrounding the second long hole 62 is disposed around each of two second screw holes 56. Each second bolt 72 has a shaft portion 72a having a thread formed thereon, and the shaft portion 72a is inserted from the housing portion 31 side of the arm part body 30 into the second long hole 62 and screwed into the second screw hole 56 of the support member 52.

The first bolt 71 inserted into the first long hole 61 is tightened to the first screw hole 54, and the second bolt 72 inserted into the second long hole 62 is tightened to the second screw hole 56, whereby the support member 52 is fastened to the arm part body 30.

Each of the first sealing member 81 and the second sealing member 82 is sandwiched between the arm part body 30 and the support member 52 and adheres to the arm part body 30 and the support member 52. The first sealing member 81 surrounds and seals the first long hole 61, and the second sealing member 82 surrounds and seals the second long hole 62. Thereby, a foreign material is inhibited from entering the housing portion 31 side or a drive unit 19 side from the long holes 61 and 62.

The first long hole 61 differs in length from the second long hole 62, and the first long hole 61 is longer than the second long hole 62. The length of the first long hole 61 is, for example, about 1.5 times to 4.0 times a screw diameter of the first bolt 71 and the second bolt 72. The length of the second long hole 62 is, for example, about 0.5 times to 1.2 times the screw diameter of the first bolt 71 and the second bolt 72.

Note that the second long hole 62 may have a length that is completely covered with the bearing surface of the head of the second bolt 72.

By loosening the first bolts 71 and the second bolts 72 with which the support member 52 is fastened to the arm part body 30, the first pulley 10 can be moved together with the support member 52 in the length direction E (front-rear direction) of the arm part body 30. The support member 52 moves in the length direction E of the arm part body 30 in such a manner that the shaft portion 71a of each first bolt 71 is guided by the first long hole 61, and the shaft portion 72a of each second bolt 72 is guided by the second long hole 62. When the first pulley 10 moves in the front-rear direction, a separation distance of the first pulley 10 to the second pulley 20, that is, an interaxial distance L between both the pulleys 10 and 20 is displaced.

Thus, in the present embodiment, the first pulley 10 can be moved in the interaxial direction F by being moved in the length direction E of the arm part body 30. This is because, although the interaxial direction F is slightly inclined with respect to the length direction E, a degree of inclination is so slight that it does not cause any hindrance to a functional aspect of the adjustment mechanism 50, and the interaxial direction F is generally along the length direction E. Therefore, in the present embodiment, it may be described that the length direction of the first long hole 61 and the second long hole 62 is along the interaxial direction F.

In the present embodiment, the first long hole 61 has a first length that allows the support member 52 supporting the first pulley 10 to move toward the second pulley 20 until the interaxial distance L between the first pulley 10 and the second pulley 20 reaches at least a distance at which a task of winding the belt 40 between the pulleys 10 and 20 can be performed. In the present embodiment, the second long hole 62 has a second length that retains the interaxial distance L between the first pulley 10 and the second pulley 20 to a distance at which the belt 40 wrapped around the pulleys 10 and 20 is prevented from being dislodged.

According to the adjustment mechanism 50 of the present embodiment, since the first long hole 61 and the second long hole 62 have the lengths described above, the belt 40 is brought into the following three states.

Figure 8:
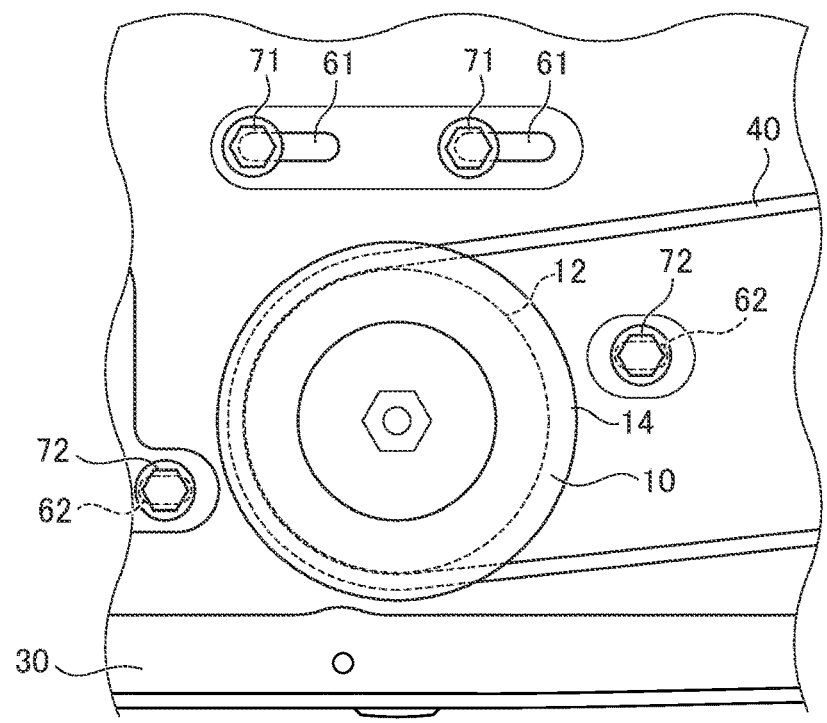
FIG. 8 is a view showing an operation of the adjustment mechanism according to the embodiment of the present disclosure and shows a state where a tension is applied to a belt.
Figure 9:
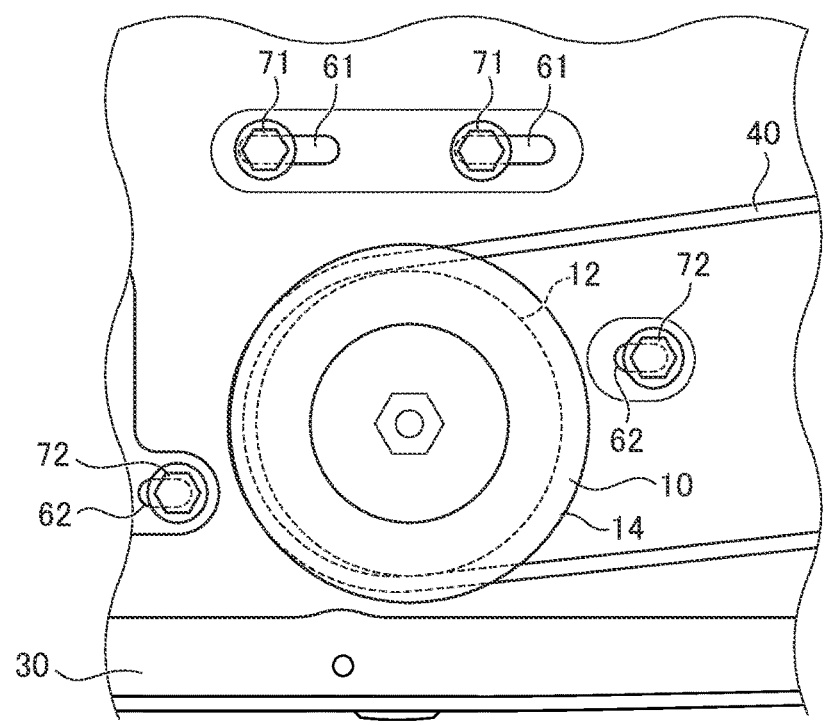
FIG. 9 is a view showing the operation of the adjustment mechanism according to the embodiment of the present disclosure and shows a state where the belt is not dislodged due to a second pulley.
Figure 10:
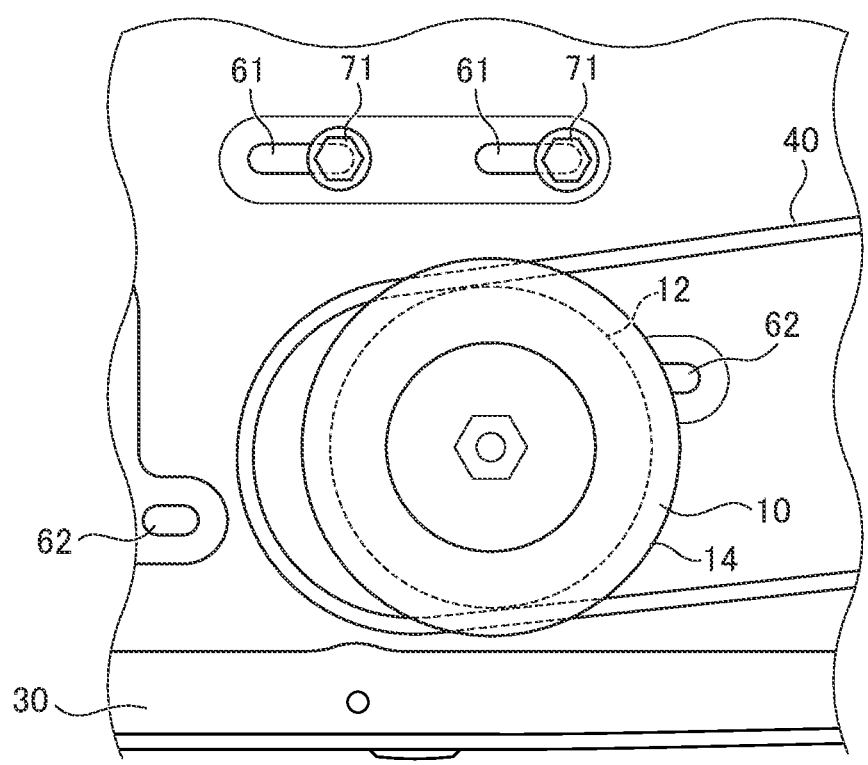
FIG. 10 is a view showing the operation of the adjustment mechanism according to the embodiment of the present disclosure and shows a state where the belt is loosened by removing a second bolt and the belt can be removed from the first pulley.

As shown in FIG. 8, when an appropriate tension is applied to the belt 40, the first bolts 71 and the second bolts 72 are fixed at positions from which the bolts can be moved both forward and rearward with respect to the first long hole 61 and the second long hole 62, respectively (first state). As shown in FIG. 9, for example, when there is slack in the first bolts 71 and the second bolts 72 and the first pulley 10 has moved forward, the second bolts 72 each engage with an inner edge of a front end of the second long hole 62 and further forward movement is restricted. At this time, the belt 40 is not dislodged from the pulleys 10 and 20, although there is slack in a wound state around the first pulley 10 and the second pulley 20 (second state). When the second bolts 72 are removed in the state where the first bolts 71 are loosened as shown in FIG. 10, the first pulley 10 can move forward until the first bolts 71 each engages with an inner edge of a front end of the first long hole 61 (third state). In this state, the task of winding the belt 40 between and around the first pulley 10 and the second pulley 20 can be performed.

Here, an example of a method of calculating an appropriate length of the second long hole 62 is illustrated. FIG.

Figure 12:
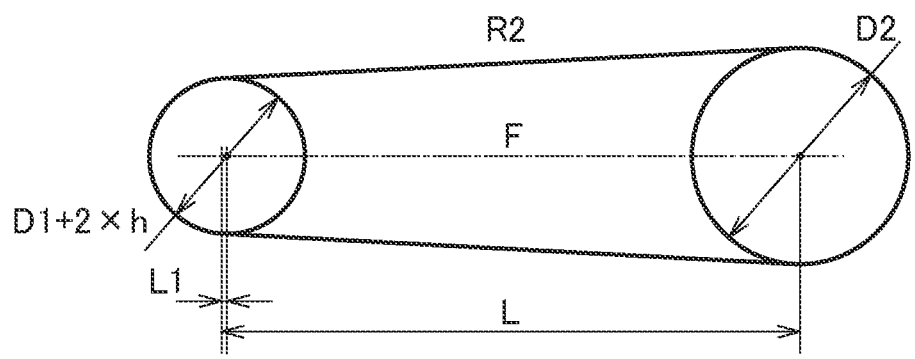
FIG. 12 is a diagram for explaining an equation for calculating the length of the long hole according to the embodiment of the present disclosure and shows a state where a first pulley with a smaller diameter is moved.
Figure 13:
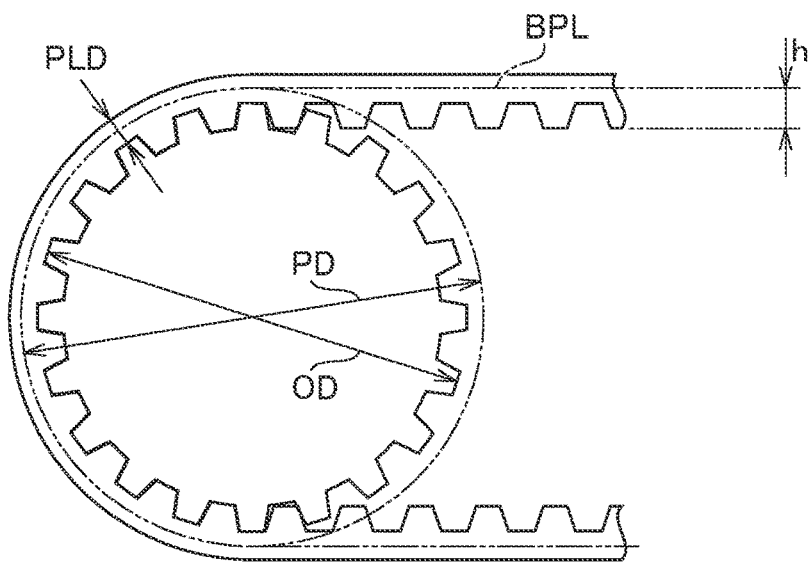
FIG. 13 is a diagram for explaining an equation for calculating the length of the long hole according to the embodiment of the present disclosure and shows a pitch circle diameter and a tooth tip circle diameter of the pulley.

11 shows ideal mounting positions of a small-diameter pulley (corresponding to the first pulley 10) and a large-diameter pulley (corresponding to the second pulley 20). FIG. 12 shows a state where the first pulley is moved by L1 in the interaxial direction F. FIG. 13 shows a state where a belt as a timing belt engages with a small-diameter pulley as a timing pulley.

Figure 11:
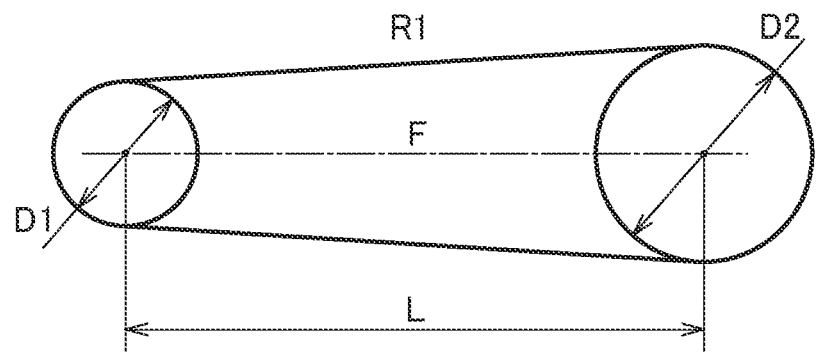
FIG. 11 is a diagram for explaining an equation for calculating a length of a long hole according to the embodiment of the present disclosure and shows an ideal mounting position of the pulley.

In FIGS. 11 and 12,
when L indicates an approximate interaxial distance (mm),
D2 indicates a diameter (mm) of a large pulley (second pulley), and
D1 indicates a diameter (mm) of a small pulley (first pulley),
L, D2 and D1 at the pulley mounting position are determined by design, and an approximate circumference R of the belt at that time is represented by:

$$R \approx 2L + \{\pi(D2+D1)/2\} + \{(D2-D1)\times(D2-D1)/4L\}.$$

As shown in FIG. 12, whether or not the belt is dislodged from the pulley when the small-diameter pulley moves by the length L1 indicates whether or not an approximate circumference R2 of the belt around a circle obtained by adding a height h of belt teeth (see FIG. 13) to the small-diameter pulley is longer than an approximate circumference R1 of the belt at the ideal mounting position of the pulley shown in FIG. 11 (R2>R1).

To obtain a pitch circle diameter PD and a tooth tip circle diameter OD of the pulley shown in FIG. 13, when P indicates a belt pitch (pitch of belt teeth) (mm), N indicates a number of teeth of the pulley, and PLD indicates a distance between a belt pitch line (BPL) of the belt and a bottom surface of the tooth, the pitch circle diameter is obtained by $$PD=(P\times N)/\pi, \text{ and}$$

the tooth tip circle diameter is obtained by $$OD=PD-(2\times PLD).$$

Figure 14:
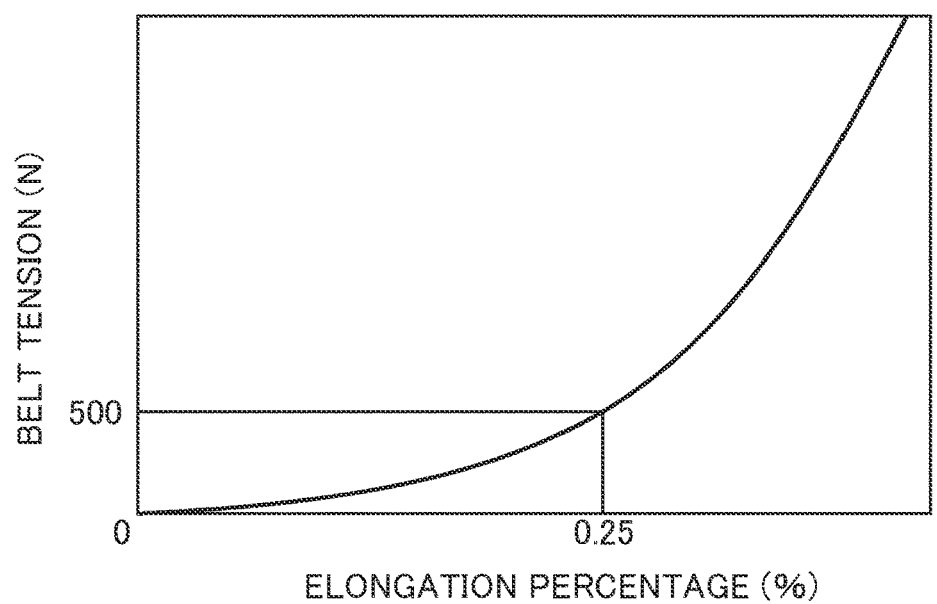
FIG. 14 is a graph for explaining an equation for calculating the length of the long hole according to the embodiment of the present disclosure and illustrates a relationship between a belt tension and an elongation percentage in the belt.

When a relationship between a belt tension and an elongation percentage of the belt is obtained as in a graph shown in FIG. 14, an adjustment allowance L2 of a required belt tension is given by $L2=\alpha\times L/100$, wherein
L3 indicates a geometric tolerance adjustment allowance, and $\alpha$ indicates a required belt elongation percentage. From the foregoing, when a value resulting in R1=R2 is defined as L1, if the second long hole is designed so as to satisfy:

$$L2+L3<L1,$$

the belt is prevented from being dislodged from the pulley.

The above-described present embodiment provides the following effects. The belt drive device 1 according to the present embodiment includes the first pulley 10 and the second pulley 20 that are rotatably arranged at a predetermined distance in the arm part body 30, the belt 40 that is configured to be wrapped around the first pulley 10 and the second pulley 20, the wrist bending part 106 that is rotated by the rotation of the second pulley 20, and the adjustment mechanism 50 that is provided to the first pulley 10 and configured to adjust the interaxial distance L between the first pulley 10 and the second pulley 20. The adjustment mechanism 50 includes the support member 52 that rotatably supports the first pulley 10, the first long hole 61 provided in the arm part body 30, the first long hole having the length direction along the interaxial direction F that connects the rotation axis of the first pulley and the rotation axis of the second pulley, the first bolt 71 including the shaft portion 71a that is inserted into the first long hole 61 and that fastens the support member 52 to the arm part body 30, the second long hole 62 provided in the arm part body 30, the second long hole having the length direction along the interaxial direction F, the second long hole 62 being shorter than the first long hole 61, and the second bolt 72 including the shaft portion 72a that is inserted into the second long hole 62 and that fastens the support member 52 to the arm part body 30, the first long hole 61 has the first length that allows the support member 52 to move toward the second pulley 20 until the interaxial distance L reaches at least the distance at which the belt 40 can be wrapped around the first pulley 10 and the second pulley 20, and the second long hole 62 has the second length that retains the interaxial distance L to a distance at which the belt 40 wrapped around the first pulley 10 and the second pulley 20 is prevented from being dislodged.

With this feature, even if the first bolt 71 and the second bolt 72 are both loosened, the second bolt 72 engages with the inner edge of the front side of the second long hole 62, so that the interaxial distance L between the pulleys 10 and 20 is retained to the distance at which the belt 40 is prevented from being dislodged. Thus, the belt 40 can be inhibited from being dislodged from the pulleys 10 and 20. As a result, the second pulley 20 is held in a state of being braked by the belt 40, and the wrist bending part 106 can be inhibited from rotating together with the second pulley 20 due to gravity. The second long hole 62 is shorter than the first long holes 61, and hence unlike a case where the second long hole 62 is as long as the first long hole 61, a machining hole 30d, and an additional member 80 and the like can be arranged densely in the vicinity of the second long hole 62. For this reason, the thickness of the arm part body 30 can be reduced to a larger extent, and the arm part body 30 can be made compact.

In the belt drive device 1 according to the present embodiment, the adjustment mechanism 50 further includes the annular first sealing member 81 surrounding the first long hole 61, and the annular second sealing member 82 surrounding the second long hole 62, and each of the first sealing member 81 and the second sealing member 82 is sandwiched between the arm part body 30 and the support member 52.

With this feature, the foreign material can be inhibited from entering the housing portion 31 side or the drive unit 19 side from each of the long holes 61 and 62. In particular, since the second sealing member 82 is shorter, the second sealing member 82 can be made smaller than the first sealing member 81.

In the belt drive device 1 according to the present embodiment, the adjustment mechanism 50 includes a plurality of first long holes 61, and the plurality of first long holes 61 extend parallel to and collinearly with each another.

With this feature, the first pulley 10 smoothly moves in the front-rear direction along the plurality of first long holes 61, which makes it easy to adjust the interaxial distance L.

In the present embodiment, the second long hole 62 can be completely covered with the bearing surface of the head of the second bolt 72.

With this feature, an area of the bearing surface at which the second bolt 72 is pressed against the arm part body 30 during fastening can be larger than that of the first bolt 71 inserted into the first long hole 61, and the fixing strength can be increased.

The present disclosure is not limited to the above embodiment and can be modified as appropriate. For example, in the above embodiment, the first long holes 61 and the second long holes 62 are provided in the arm part body 30, but the present invention is not limited thereto. Each of the long holes 61 and 62 may be provided in at least one selected from the arm part body 30 and the support member 52. Specifically, the long holes 61 and 62 may be provided in the support member 52 or may be provided in both the support member 52 and the arm part body 30. The bolts are used as the fastening members, but other fastening members such as rivets may be used in place of the bolts. The pulleys 10, 20 and the belt 40 are configured as the toothed timing pulley and the timing belt but may be a flat pulley and a flat belt each having a smooth circumferential surface.

EXPLANATION OF REFERENCE NUMERALS

1: belt drive device
10: first pulley
20: second pulley
30: arm part body (device main body)
40: belt
50: adjustment mechanism
52: support member
61: first long hole
62: second long hole
71: first bolt (first fastening member)
71*a*: shaft portion of the first bolt
72: second bolt (second fastening member)
72*a*: shaft portion of the second bolt
81: first sealing member
82: second sealing member
100: articulated robot
106: wrist bending part (rotating member)
F: interaxial direction
L: interaxial distance

The invention claimed is:

1. A belt drive device comprising:
a first pulley and a second pulley that are rotatably arranged at a predetermined distance in a device main body,
a belt that is configured to be wrapped around the first pulley and the second pulley, and
an adjustment mechanism that is provided to the first pulley and configured to adjust an interaxial distance between the first pulley and the second pulley, wherein the adjustment mechanism includes:
a support member that rotatably supports the first pulley,
a first long hole provided in at least one selected from the device main body and the support member, the first long hole having a length direction along an interaxial direction that connects a rotation axis of the first pulley and a rotation axis of the second pulley,
a first fastening member including a shaft portion that is inserted into the first long hole and that fastens the support member to the device main body,
a second long hole provided in at least one selected from the device main body and the support member, the second long hole having a length direction along the interaxial direction, the second long hole being shorter than the first long hole, and
a second fastening member including a shaft portion that is inserted into the second long hole and that fastens the support member to the device main body,
the first long hole has a first length that allows the support member to move toward the second pulley until the interaxial distance reaches at least a distance at which the belt cam be wrapped around the first pulley and the second pulley when the second fastening member is removed, and
the second long hole has a second length that retains the interaxial distance to a distance at which the belt wrapped around the first pulley and the second pulley is prevented from being dislodged when the second fastening member is installed.

2. The belt drive device according to claim 1, wherein the adjustment mechanism further includes:
an annular first sealing member surrounding the first long hole, and
an annular second sealing member surrounding the second long hole, and
each of the first sealing member and the second sealing member is sandwiched between the device main body and the support member.

3. The belt drive device according to claim 1, wherein in the adjustment mechanism, the first long hole comprises a plurality of first long holes, and
the plurality of first long holes extend parallel to and collinearly with each another.

4. The belt drive device according to claim 1, wherein the first pulley and the second pulley are each a timing pulley, and
the belt is a timing belt that engages with the first pulley and the second pulley.

5. The belt drive device according to claim 1, wherein the device main body includes an arm part body of an articulated robot, and
the second pulley rotates a rotating member of the articulated robot.

6. The belt drive device according to claim 1, wherein the second fastening member is a bolt, and the second long hole is completely coverable with a bearing surface of a head of the bolt.

\* \* \* \* \*